(12) United States Patent
Tanaka

(10) Patent No.: US 8,152,392 B2
(45) Date of Patent: Apr. 10, 2012

(54) LABEL PRODUCING APPARATUS

(75) Inventor: Mitsugi Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 592 days.

(21) Appl. No.: 11/668,468

(22) Filed: Jan. 30, 2007

(65) Prior Publication Data

US 2007/0127968 A1    Jun. 7, 2007

Related U.S. Application Data

(63) Continuation-in-part of application No. PCT/JP2005/014659, filed on Aug. 10, 2005.

(30) Foreign Application Priority Data

Aug. 12, 2004   (JP) .................. 2004-235056

(51) Int. Cl.
*B41J 15/00* (2006.01)
*G06K 17/00* (2006.01)
*G06K 19/00* (2006.01)

(52) U.S. Cl. ............... 400/613; 400/615.2; 400/619

(58) Field of Classification Search ............ 400/76, 400/613, 615.2, 619; 340/572.7, 572.8
See application file for complete search history.

(56) References Cited

U.S. PATENT DOCUMENTS

| | | | |
|---|---|---|---|
| 6,129,462 A | 10/2000 | Furuya et al. | |
| 2006/0163368 A1 * | 7/2006 | Fogg et al. ............ | 235/492 |

FOREIGN PATENT DOCUMENTS

| | | | |
|---|---|---|---|
| JP | H10-000827 A | | 1/1998 |
| JP | H11-048542 A | | 2/1999 |
| JP | 2000-278270 A | | 10/2000 |
| JP | 2001-030480 A | | 2/2001 |
| JP | 2002-015288 A | | 1/2002 |
| JP | 2003-159838 | * | 3/2003 |
| JP | 2003-140548 A | | 5/2003 |
| JP | 2005122633 | * | 5/2005 |

OTHER PUBLICATIONS

International Bureau of WIPO, International Search Report for Related Application No. PCT/JP2005/014659 mailed Sep. 27, 2005.
Japan Patent Office, Notice of Reasons for Rejection in counterpart Patent Application No. JP 2006-531684, mailed Aug. 19, 2010.
European Patent Office, extended European Search Report for European Patent Application No. 05770454.6 (counterpart to above-captioned patent application), dated Aug. 4, 2011.

* cited by examiner

*Primary Examiner* — Leslie Evanisko
*Assistant Examiner* — Marissa Ferguson Samreth
(74) *Attorney, Agent, or Firm* — Baker Botts L.L.P.

(57) ABSTRACT

A tag label device includes a cartridge, a cartridge holder portion, and an antenna. The cartridge has a first roll around which a cover tape is wound and is detachably mounted in the cartridge holder portion. The cover tape has a plurality of RFID circuit elements To for transmitting and receiving information disposed thereon. Each of the RFID circuit elements To has an IC circuit part for storing information and an antenna connected to said IC circuit part. The antenna is disposed in the vicinity in a surface intersecting a tape surface of a path of the cover tape fed out from the first roll and transmits created RFID tag communicating information to the antenna by wireless communication and writes it to said IC circuit part. With this arrangement, the tag label device can arrange a tag medium as the cartridge without restricting the mounting/dismounting property of the cartridge and the layout of the cartridge holder portion.

5 Claims, 14 Drawing Sheets

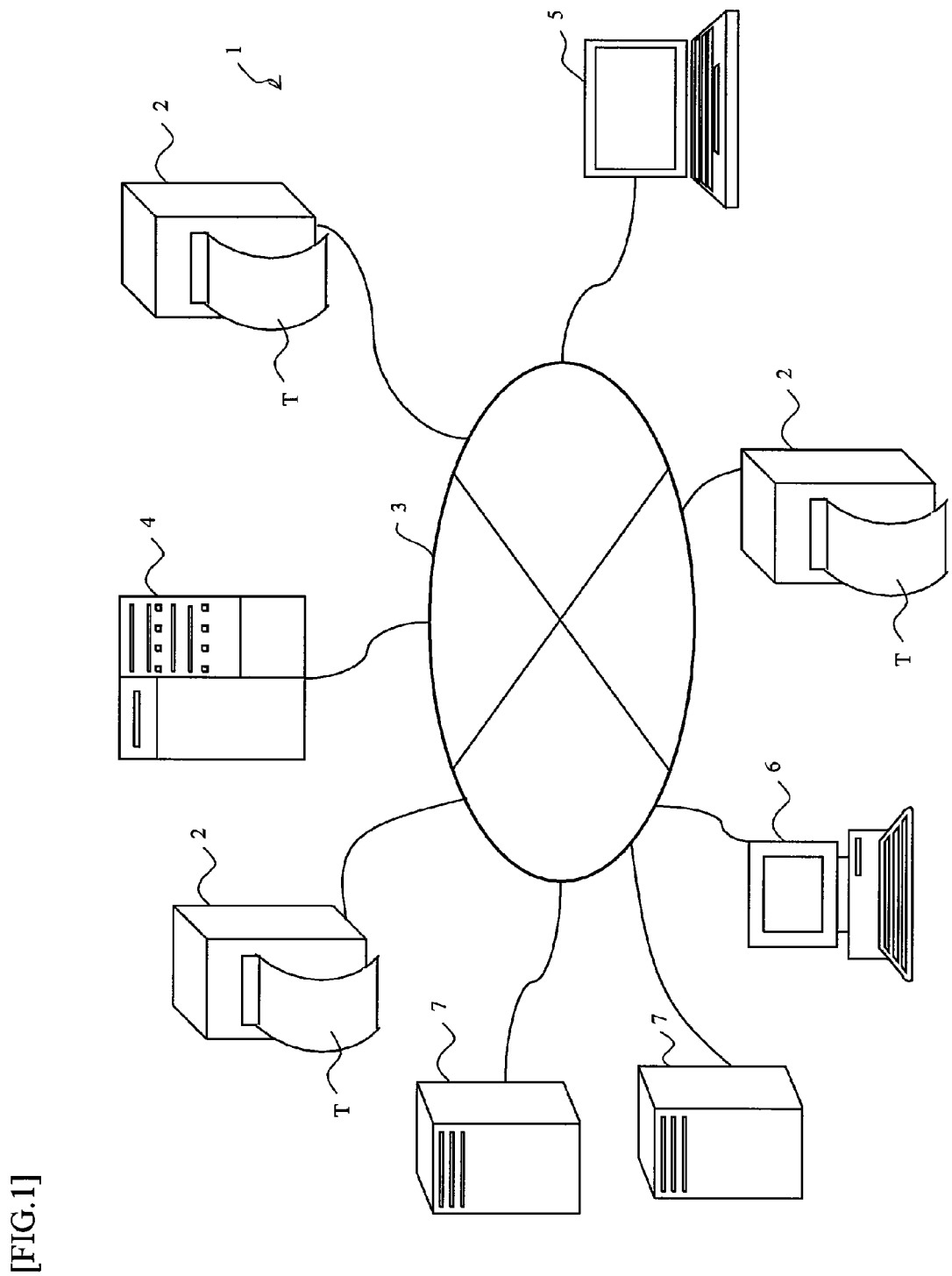
[FIG.1]

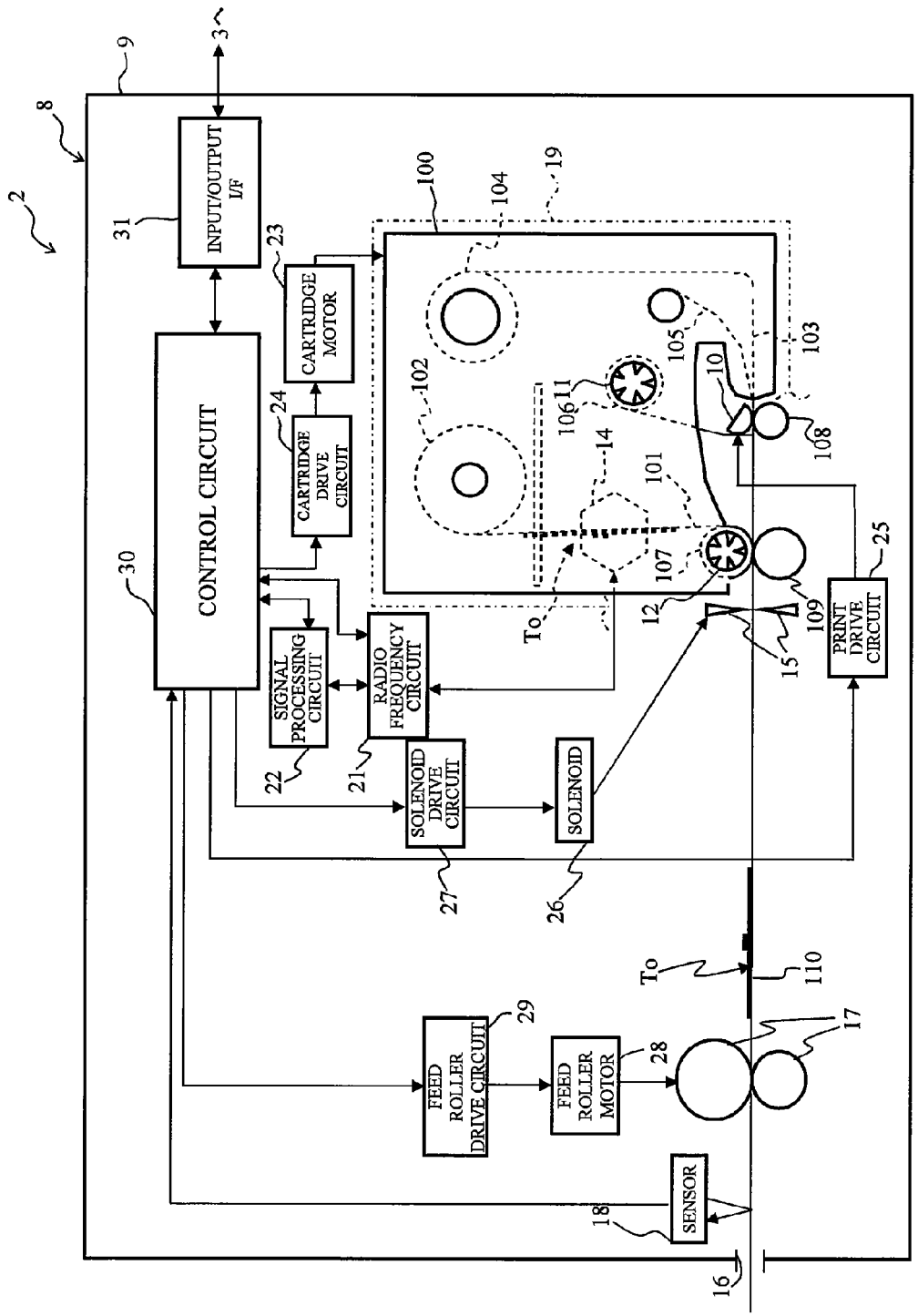
[FIG.2]

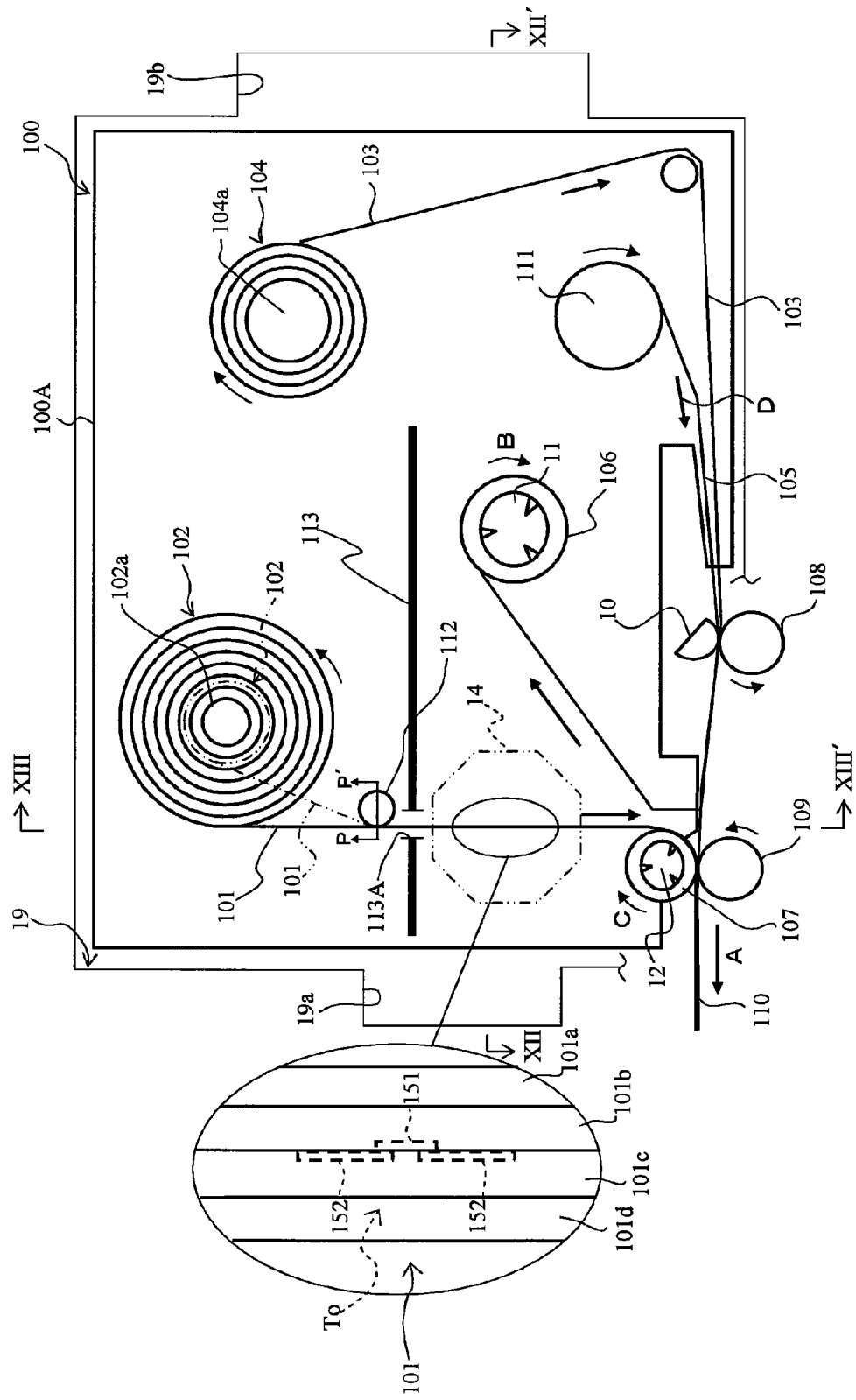

[FIG.4]
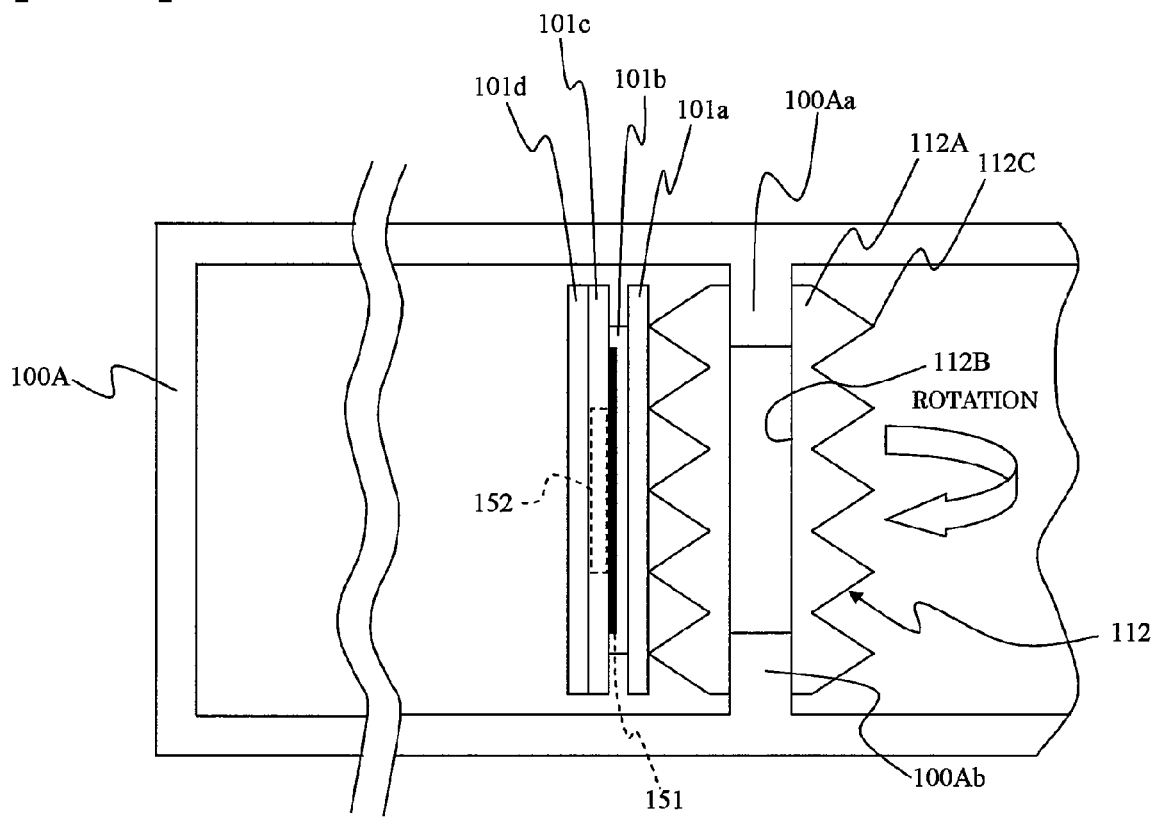

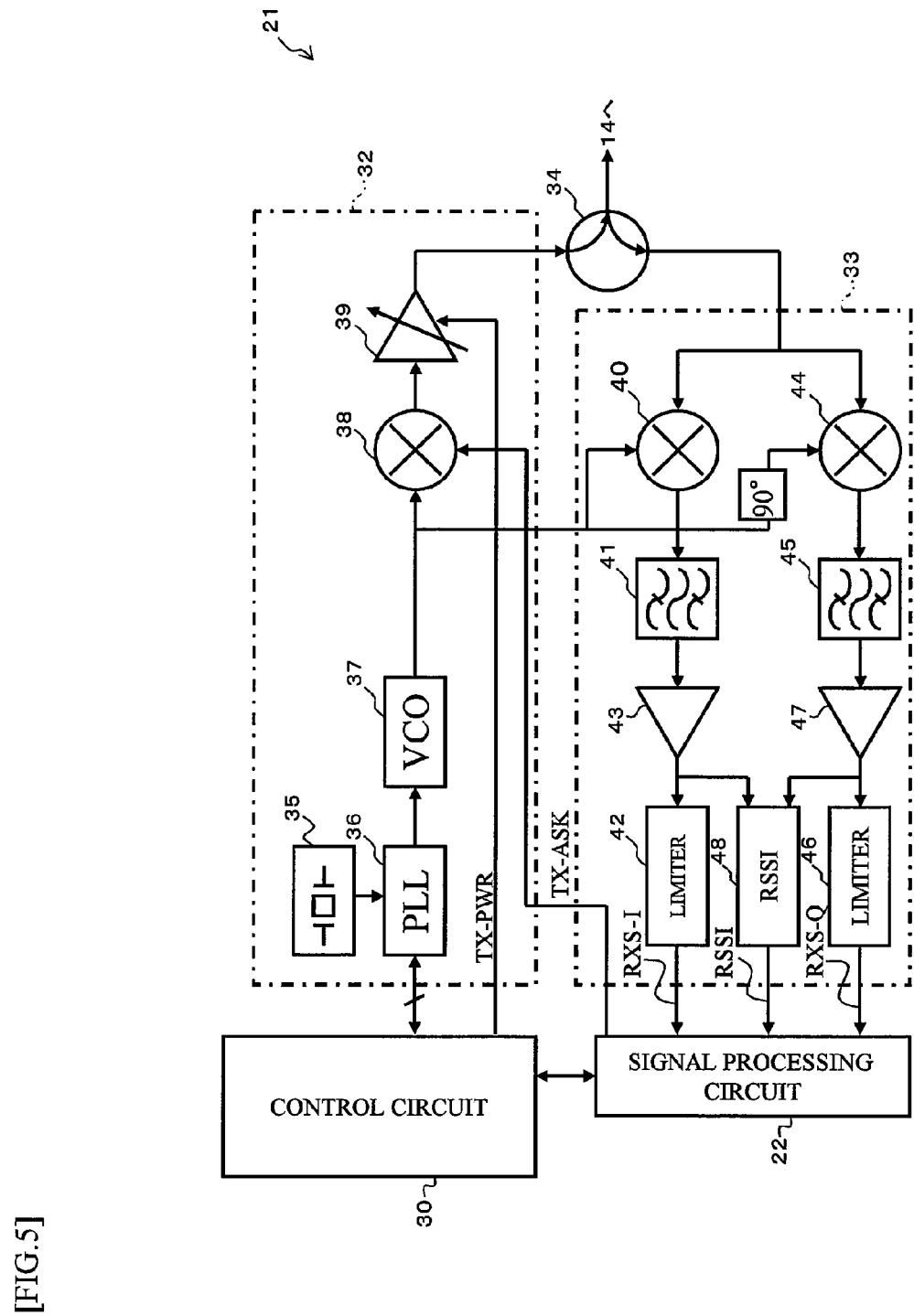
[FIG.5]

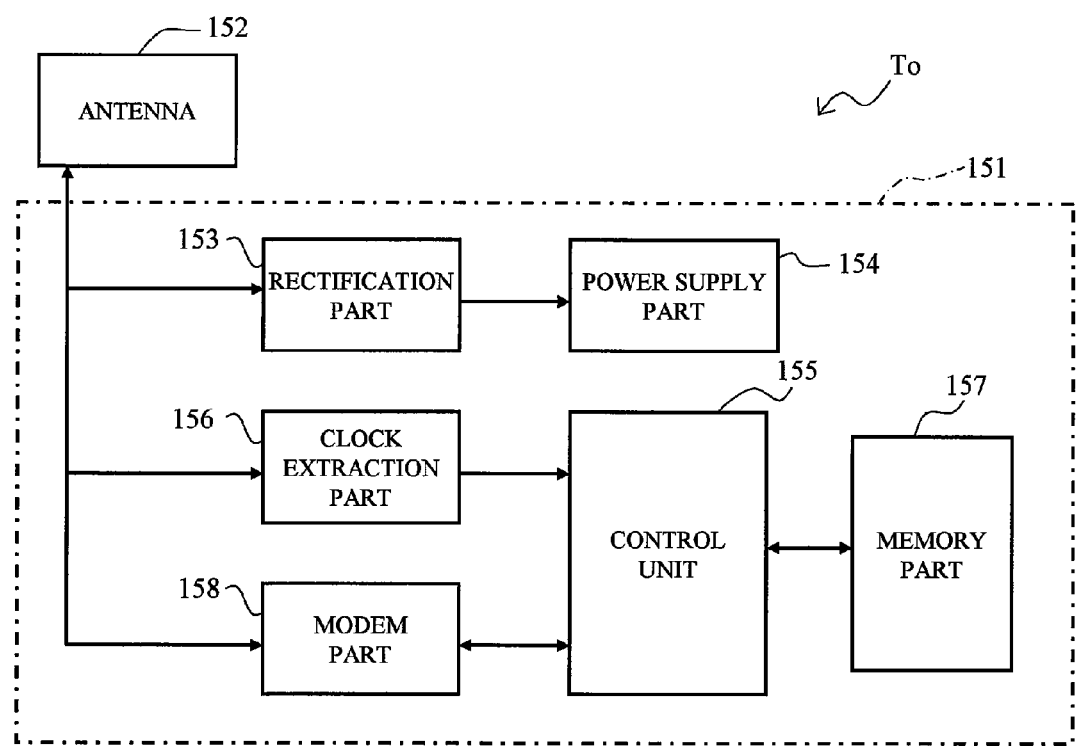
[FIG.6]

[FIG.7A]
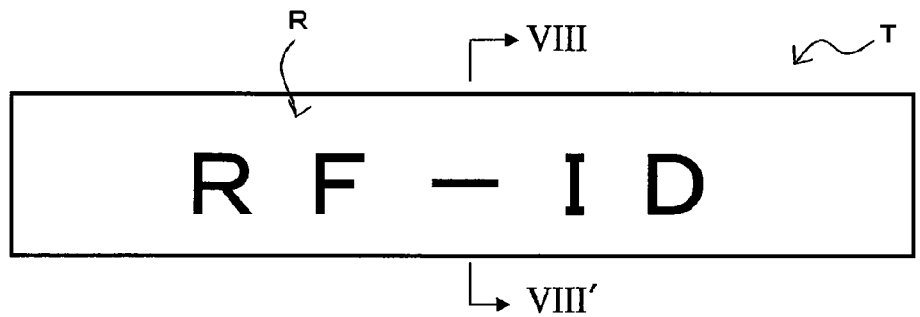
[FIG.7B]
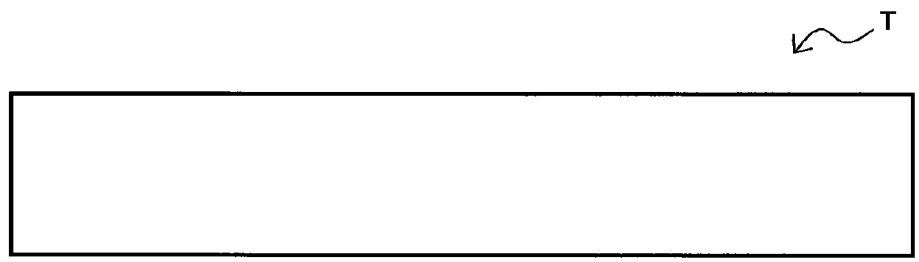
[FIG.8]
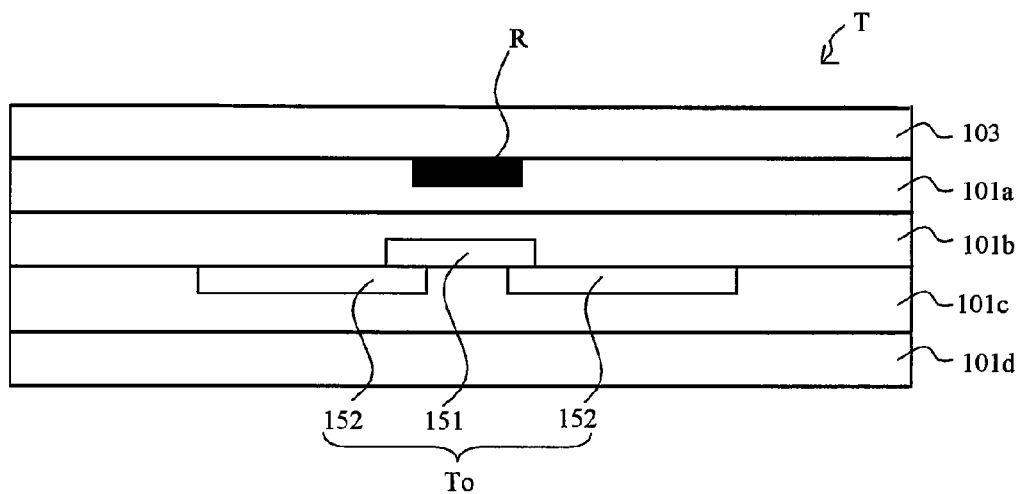

[FIG.9]

| PRINT LETTER |
| --- |
| R F — I D |

| ACCESS ID |
| --- |
| 1 6 , 7 7 7 , 2 1 5 |

| COMMODITY INFORMATION |
| --- |
| 1 3 1 , 0 7 1 |

| SERVER INFORMATION |
| --- |
| 2 , 0 9 7 , 1 5 1 |

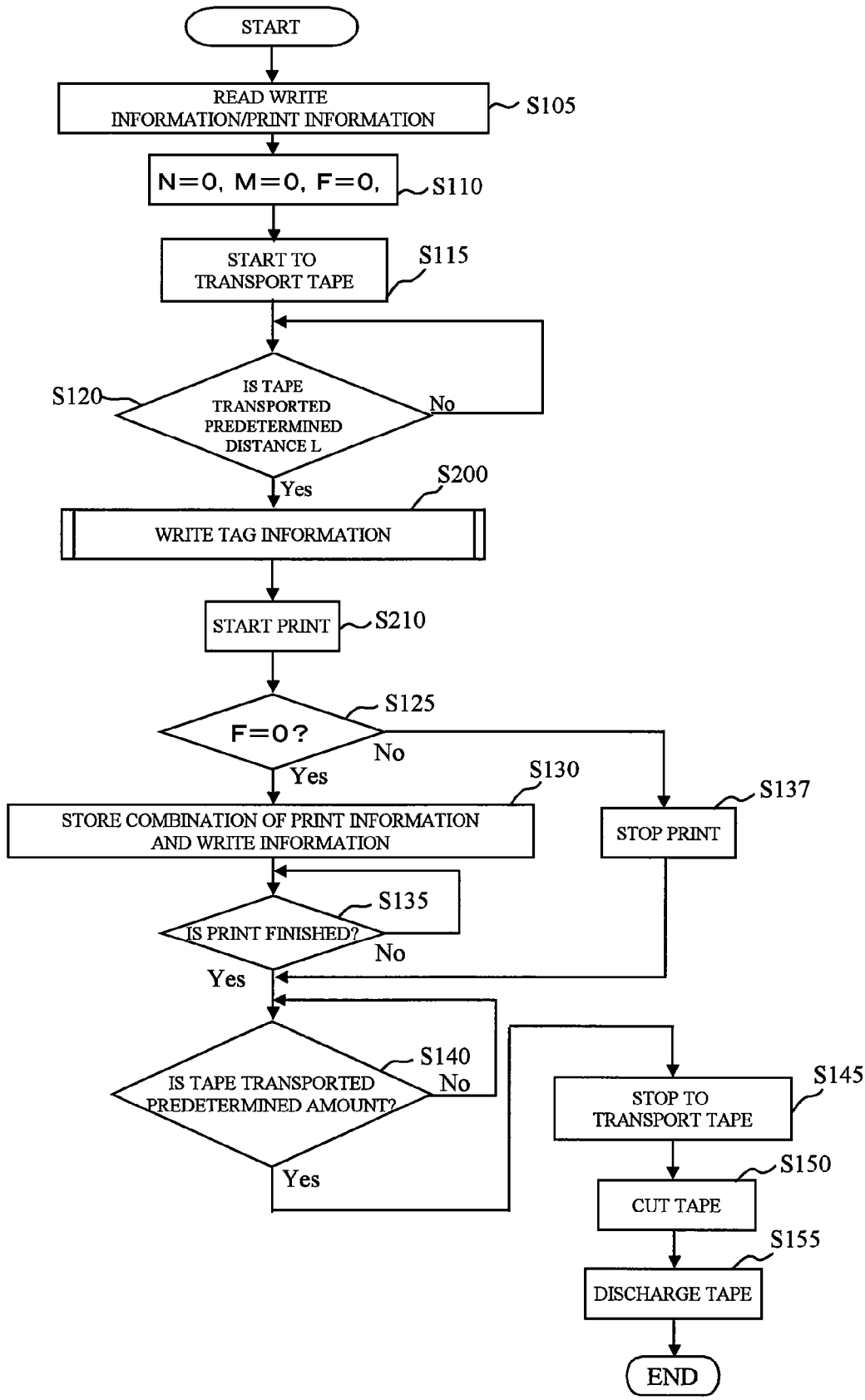
[FIG.10]

[FIG.11]
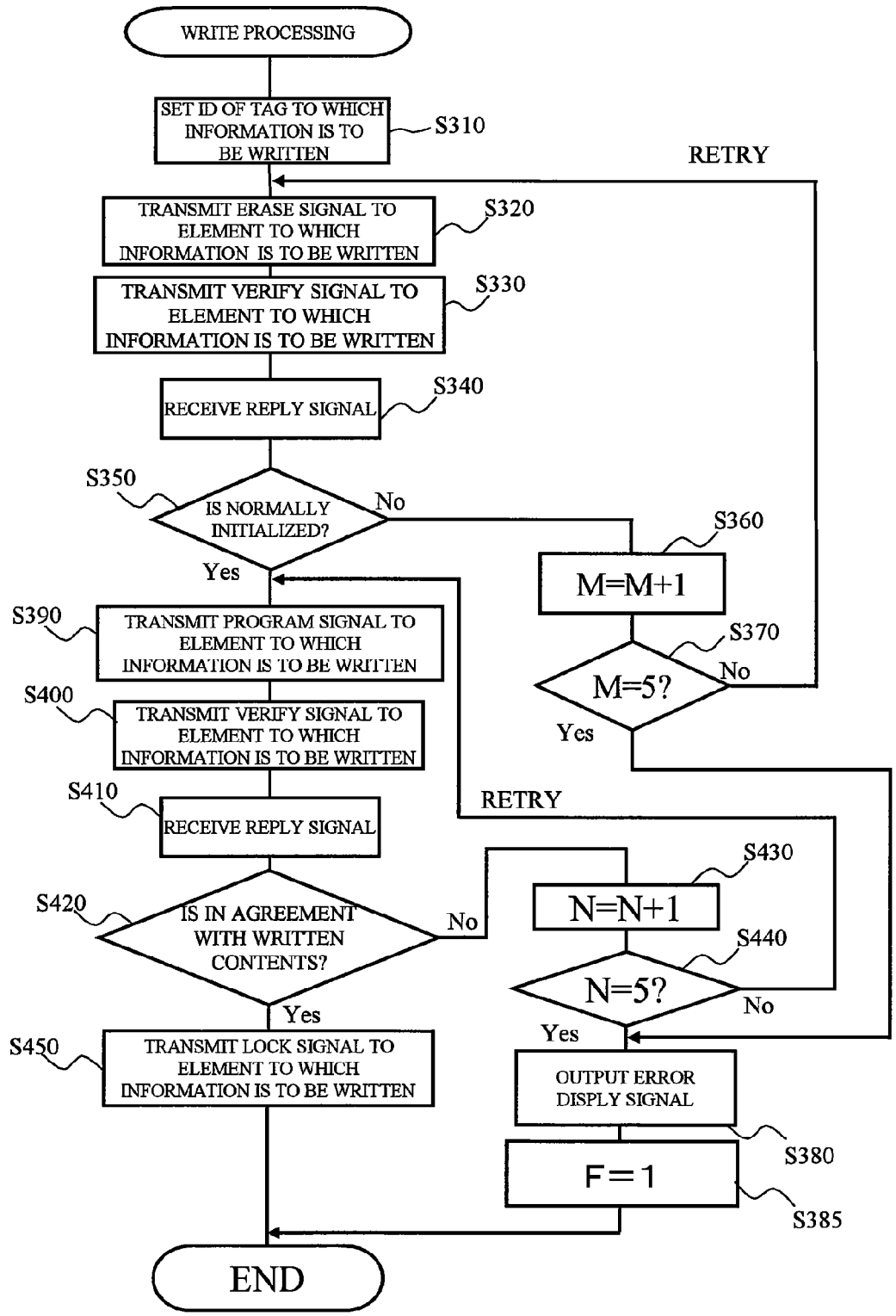

[FIG.12]
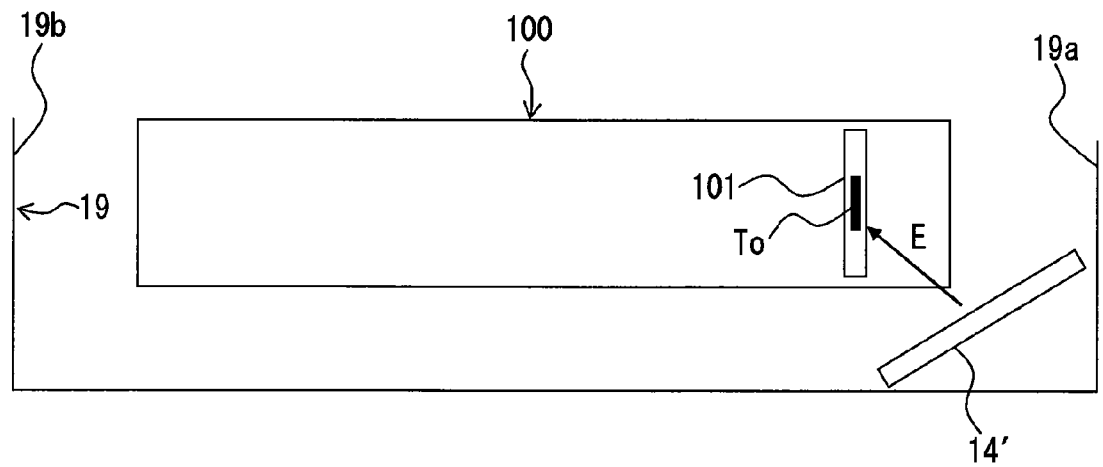
[FIG.13]
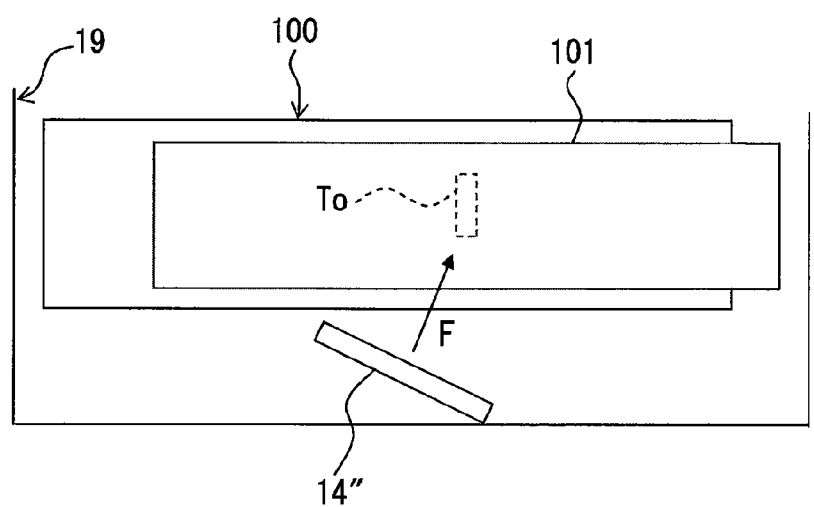

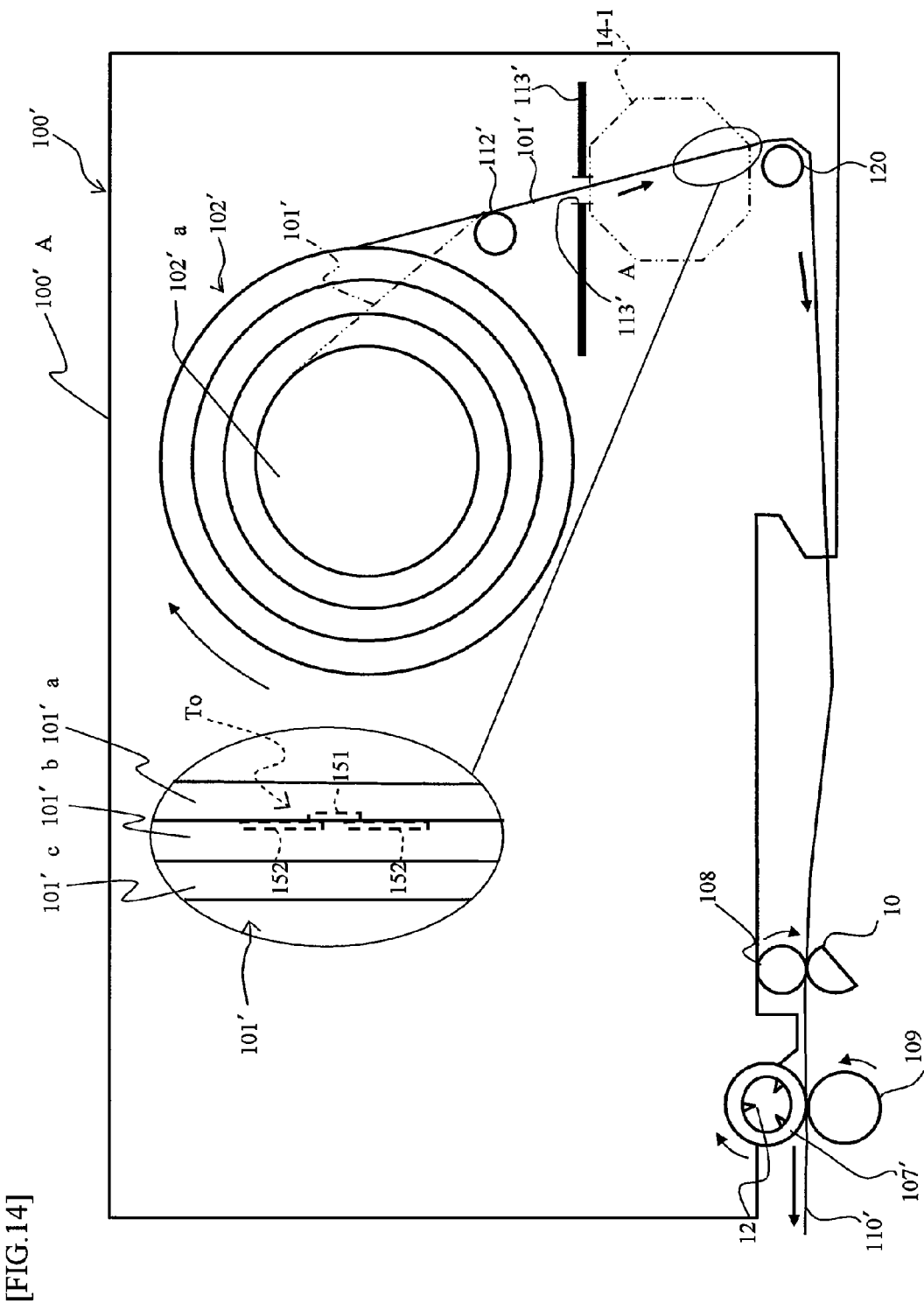

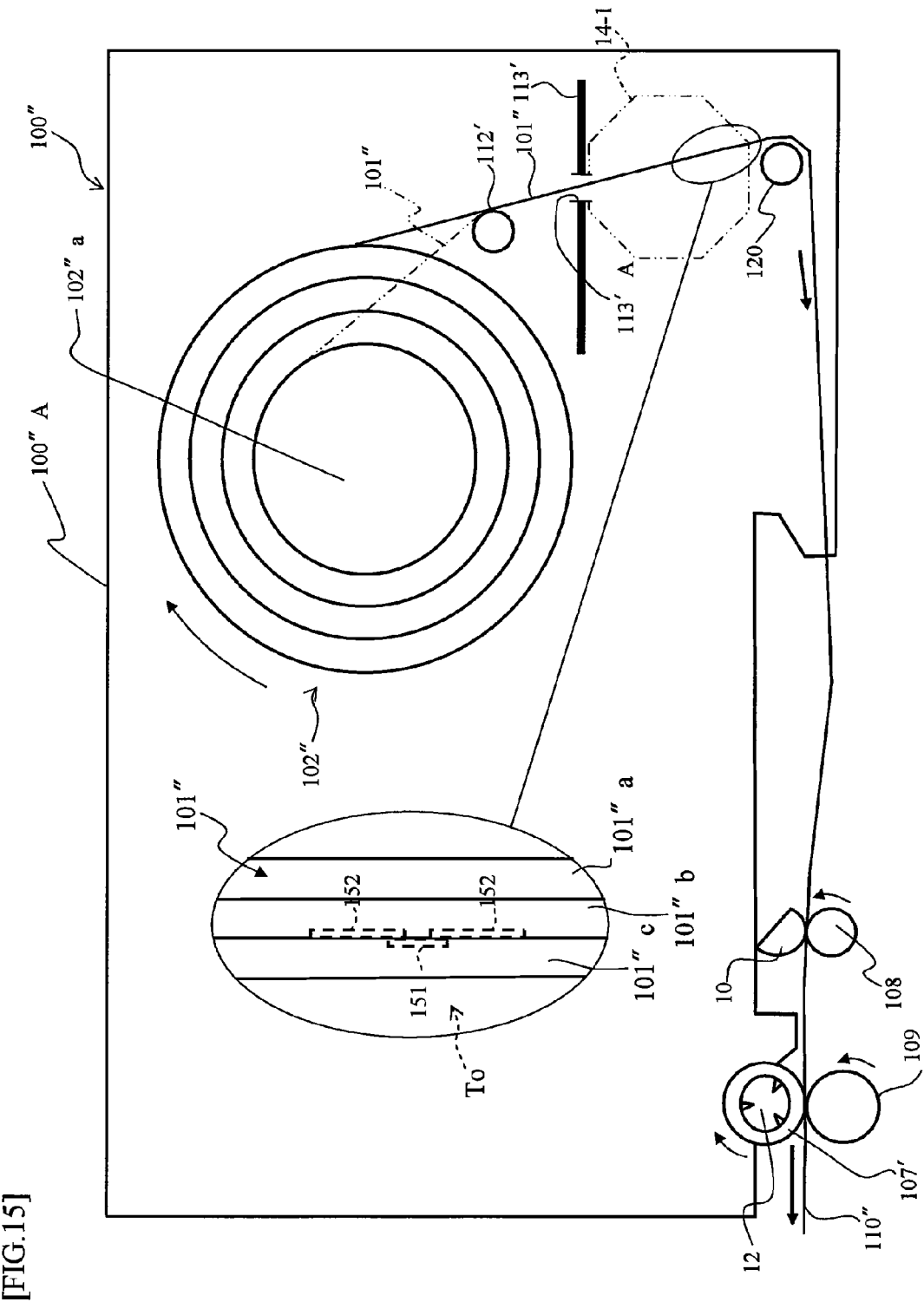
[FIG.15]

[FIG.16]
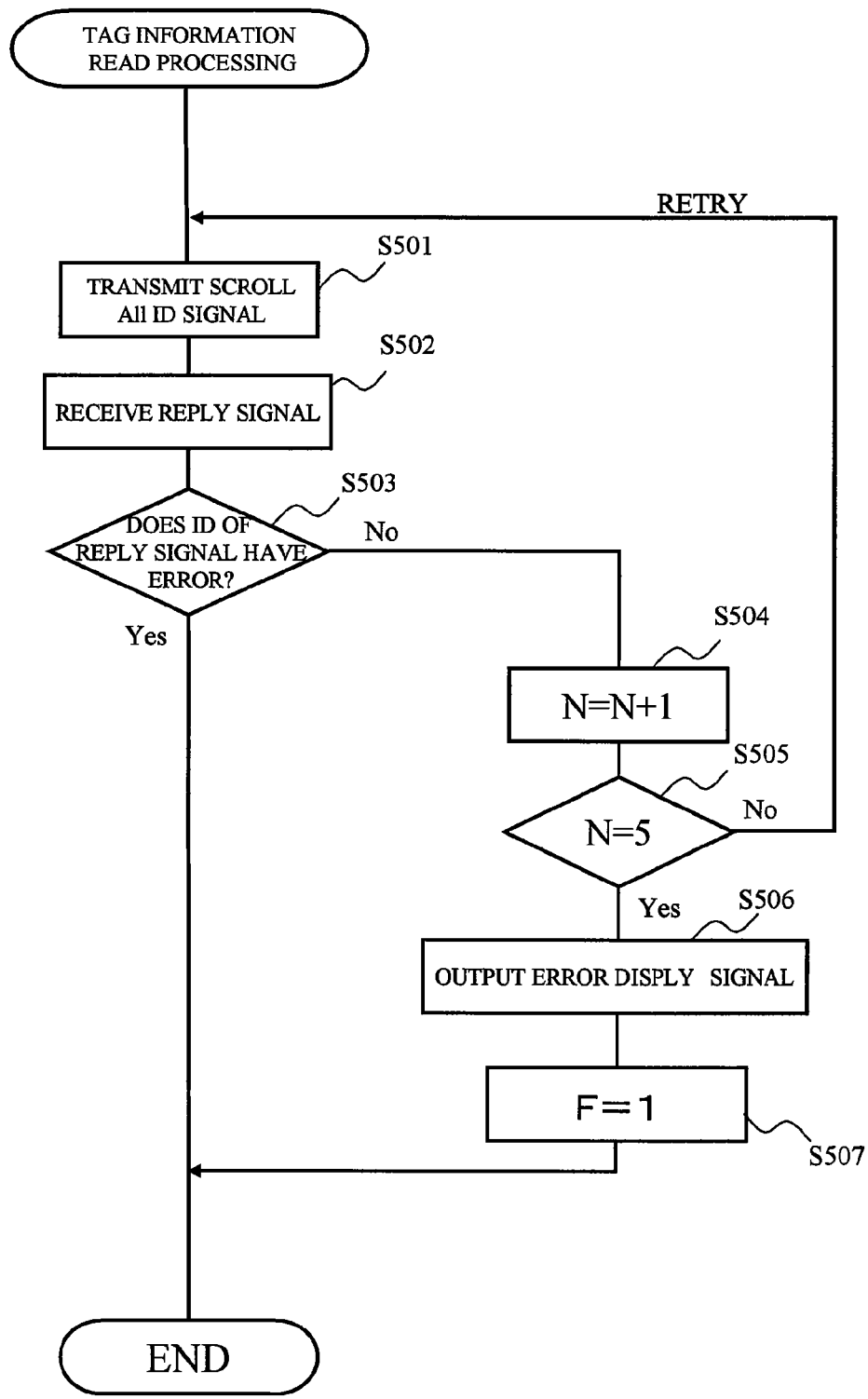

LABEL PRODUCING APPARATUS

CROSS-REFERENCE TO RELATED APPLICATION

This is a CIP application PCT/JP2005/14659, filed Aug. 10, 2005, which was not published under PCT article 21(2) in English and claims the benefits of Japanese Patent application No. 2004-235056 filed Aug. 12, 2004.

BACKGROUND OF THE INVENTION

1. Field of the Invention

The present invention relates to a label producing apparatus for continuously producing RFID tag labels capable of reading or writing RFID tag communicating information from the outside through wireless communication.

2. Description of the Related Art

There are known RFID (Radio Frequency Identification) systems for reading and writing information between a compact RFID tag and a reader (reading device)/writer (writing device) in a non-contact manner. For example, a RFID circuit element, which is disposed to, for example, a label-shaped RFID tag, has an IC circuit part for storing predetermined RFID tag communicating information and an antenna connected to the IC circuit part for transmitting and receiving information. Accordingly, even if the RFID tag is soiled or disposed at an invisible position, the reader/writer can access the RFID tag communicating information of the IC circuit part (can read/write the information), and thus it is expected to use the RFID systems in various fields such as commodity management, inspection process, and the like.

There is known a writer (printer) disclosed in, for example, patent publication 1 as a writer (printer) for writing information to the RFID circuit element. In the conventional technology, a strip-shaped tag medium (base sheet), on which rectangular labels (RFID labels) are bonded at predetermined intervals, is fed out, and when the tag medium passes through a transport path, predetermined RFID tag communicating information created on a device side is transmitted to antennas of RFID circuit elements contained in the respective labels and sequentially written to IC circuit parts (IC chips) connected to the antennas. Thereafter, the labels are transported downstream in a transporting direction, and print information corresponding to the RFID tag communicating information written above is printed to the surface of the RFID labels by a printing device (thermal head), thereby RFID tag labels are completed.

Patent Publication 1: JP,A, 2003-159838 (paragraph Nos. 0011 to 0039, FIG. 1 to FIG. 5)

In the arrangement of the conventional technology, it is contemplated to arrange a tag tape roll as a cartridge so that it can be detachably mounted on a cartridge holder portion on the device side and to replace a tag medium (tag tape) when it is exhausted together with the cartridge so that the tag medium as consumable goods can be easily and readily replenished.

In this case, to write information to the RFID circuit element of the tag medium in the cartridge, the device antenna must be disposed to a position relatively near to the cartridge. However, since the cartridge itself is frequently mounted on and dismounted from the cartridge holder portion, there is a possibility that the mounting/dismounting property of the cartridge and the layout of the cartridge holder portion may be restricted or disturbed depending on a position at which the device antenna is disposed.

SUMMARY OF THE INVENTION

An object of the present invention is to provide a tag label device in which a tag medium can be arranged as a cartridge without restricting the mounting/dismounting property of the cartridge and the layout of a cartridge holder portion.

BRIEF DESCRIPTION OF THE DRAWINGS

FIG. 1 is a system arrangement view showing a RFID tag producing system to which a label producing apparatus of an embodiment of the present invention is applied.

FIG. 2 is a conceptual arrangement view showing a detailed structure of the label producing apparatus shown in FIG. 1.

FIG. 3 is an explanatory view explaining a detailed structure of a cartridge shown in FIG. 2.

FIG. 4 is a conceptual side sectional view showing an example of a detailed structure of a guide roller in a section P-P' of FIG. 3.

FIG. 5 is a function block diagram showing a detailed function of a radio frequency circuit shown in FIG. 2.

FIG. 6 is a function block diagram showing a functional arrangement of a RFID circuit element To.

FIG. 7A is an upper surface view showing an example of an outside appearance of a RFID tag label T.

FIG. 7B is an lower surface view showing an example of an outside appearance of a RFID tag label T.

FIG. 8 is a lateral sectional view taken along the line VIII-VIII' of FIG. 7A.

FIG. 9 is a view showing an example of a screen displayed on a terminal or a general-purpose computer in communication of RFID tag communicating information.

FIG. 10 is a flowchart showing a control procedure carried out by a control circuit shown in FIG. 2.

FIG. 11 is a flowchart showing a detailed procedure at step S200 of FIG. 10.

FIG. 12 is a sectional view which simply shows a structure in a cartridge holder portion of a modification in which an antenna is disposed to a different position and corresponds to a section taken along the line XII-XII of FIG. 3.

FIG. 13 is a sectional view which simply shows a structure in a cartridge holder portion of a modification in which an antenna is disposed to a further different position and corresponds to a section taken along the line XIII-XIII' of FIG. 3.

FIG. 14 is an explanatory view explaining a detailed structure of a cartridge of a modification in which a tape is not bonded.

FIG. 15 is an explanatory view explaining a detailed structure of a cartridge of a modification in which a print is carried out from inside of a cartridge.

FIG. 16 is a flowchart showing a procedure for reading RFID tag communicating information carried out by a control circuit.

DETAILED DESCRIPTION OF THE PREFERRED EMBODIMENTS

An embodiment of the present invention will be described with reference to the drawings.

FIG. 1 is a system arrangement view showing a RFID tag producing system 1 to which a label producing apparatus 2 of the embodiment is applied.

In the RFID tag producing system 1 shown in FIG. 1, the label producing apparatus 2 according to the embodiment is connected to a route server 4, a terminal 5, a general purpose computer 6, and a plurality of information servers 7 through a wired or wireless communication line 3.

FIG. 2 is a conceptual arrangement view showing a detailed structure of the label producing apparatus.

In FIG. 2, a cartridge holder portion 19 (shown by a dot-dash-line in FIG. 2) as a recessed portion is formed to a main body 8 of the label producing apparatus 2, and a cartridge 100 is detachably mounted in the cartridge holder portion 19.

The main body 8 includes a print head (thermal head) 10 as a printing device for printing a predetermined letter (carrying out a print) to a print-receiving tape 103 fed out from a second roll 104 (roll for the to-be-printed tape); a ribbon take-up roller drive shaft 11 for driving an ink ribbon 105 that has finished the print to the print-receiving tape 103; a pressure joint roller drive shaft (feeding device, bonding device) 12 for transporting the print-receiving tape 103 and a cover tape (tag tape, tag medium) 101 fed out from a first roll (tag tape roll) 102 as a printed tag label tape 110 while bonding the print-receiving tape 103 to the cover tape 101; an antenna (device antenna) 14 for transmitting and receiving a signal between it and RFID circuit elements To (that will be described later in detail) disposed to the printed tag label tape 110 using a radio frequency of a UHF band and the like; a cutter 15 for producing label-shaped RFID tag labels T (that will be described later in detail) by cutting off the printed tag label tape 110 to a predetermined length at predetermined timing; feed rollers 17 for transporting and delivering the RFID tag labels T to a delivery port (discharge port 16); and a housing 9 for constituting a shell for accommodating these components and having the cartridge holder portion 19, to which the cartridge 100 is detachably fitted, and the delivery port 16.

The antenna 14 is composed of a directional antenna (in the example, a so-called patch antenna) having a directional property on one side (in the example, on a proximal side with respect to a sheet surface of FIG. 2) and disposed in the vicinity of a path in a surface intersecting a tape surface (in the example, a surface orthogonal to the tape surface; however, the surface is not limited to it and may intersect the tape surface at an intersecting angle of 45°, 60°, and the like other than 90°) in a path of the cover tape 101 (here, from a guide roller 112 or a passing-through hole 113A of a shield member 113 which will be described later to the pressure joint roller drive shaft 12) fed out from the first roll 102 on a distal side in a direction in which the cartridge 100 is mounted (in the example, on a distal side with respect to the sheet surface in FIG. 2).

In contrast, the main body 8 further includes a radio frequency circuit 21 for accessing the RFID circuit element To (carrying out write or read operation) through the antenna 14; a signal processing circuit 22; for processing a signal read from the RFID circuit element To; a cartridge motor 23 for driving the ribbon take-up roller drive shaft 11 and the pressure joint roller drive shaft 12 described above; a cartridge drive circuit 24 for controlling the drive of the cartridge motor 23; a print drive circuit 25 for controlling the power supplied to the print head 10; a solenoid 26 for driving the cutter 15 to cause it carry out cutting operation; a solenoid drive circuit 27 for controlling the solenoid 26; a feed roller motor 28 for driving the feed rollers 17; and a control circuit 30 for controlling the label producing apparatus 2 in its entirety through the radio frequency circuit 21, the signal processing circuit 22, the cartridge drive circuit 24, the print drive circuit 25, the solenoid drive circuit 27, a feed roller drive circuit 29, and the like.

Although not illustrated in detail, the control circuit 30 is a so-called micro computer that is composed of a CPU as a central processing unit, a ROM, a RAM, and the like, and carries out signal processing according to a program previously stored in the ROM while making use of a temporarily storing function of the RAM. Further, the control circuit 30 is connected to, for example, a communication line though an input/output interface 31 so that it can transmit and receive information to and from the route server 4, the terminal 5, the general purpose computer 6, the information servers 7, and the like.

FIG. 3 is an explanatory view explaining a detailed structure of the cartridge 100.

In FIG. 3, the cartridge 100 includes a the housing 100A; the first roll 102 disposed in the housing 100A and having the cover tape 101 wound therearound; the second roll 104 having the transparent print-receiving tape 103 approximately as wide as the cover tape 101 wound therearound; a ribbon-supply-side roll 111 for rolling out the ink ribbon 105 (a thermal transfer ribbon, however, this is not necessary when the print-receiving tape is composed of a heat sensitive tape); a ribbon take-up roller 106 for taking up a ribbon 15 after it is subjected to print; and the shield member 113 for inserting a pressure joint roller 107, a guide roller (guide device) 112, and the cover tape 101 into the through hole 113A thereof to reduce leakage of a radio signal from the antenna 14 to the first roll 102 side.

The pressure joint roller 107 presses the cover tape 101 against the print-receiving tape 103 and bonds them to each other so as to arrange them as the printed tag label tape 110 and feeds the tape 110 in the direction shown by an arrow A (also acts as a tape feed roller).

The first roll 102 winds the cover tape 101, on which a plurality of the RFID circuit elements To are sequentially formed in a lengthwise direction at predetermined intervals, around a reel member 102a.

In the example, the cover tape 101 has a four-layer structure (refer to a partially enlarged view of FIG. 3) and is arranged by laminating an adhesive layer 101a composed of an appropriate adhesive material, a colored base film 101b composed of PET (polyethylene terephthalate) and the like, an adhesive layer 101c composed of an appropriate adhesive material, and a separation sheet (separation material) 101d, and the like in this order from a side thereof wound inward (on a right side in FIG. 3) to an opposite side (on a left side in FIG. 3).

An antenna (tag antenna) 152 is disposed on the back side of the base film 101b (on the left side in FIG. 3) integrally therewith so that it transmits and receives information, an IC circuit part 151 for storing information is formed so as to be connected to the antenna 152, and the RFID circuit element To is composed of them.

The adhesive layer 101a is formed on the front side of the base film 101b (on the right side in FIG. 3) to bond the print-receiving tape 103 later, and further the separation sheet 101d is bonded to the base film 101b by the adhesive layer 101c disposed to include the RFID circuit element To on the back side of the base film 101b (on the left side of FIG. 3). Note that, when the RFID tag label T is finally finished to a label shape and bonded to a predetermined commodity and the like, it can be bonded thereto through the adhesive layer 101c exposed by separating the separation sheet 101d.

The second roll 104 winds the print-receiving tape 103 around a reel member 104a. The ribbon 15 driven by the ribbon-supply-side roll 111 and the ribbon take-up roller 106, which are disposed on the back surface side of the print-receiving tape 103 fed out by the second roll 104 (that is, on a side where it is bonded to the cover tape 101) is abutted against the back surface of the print-receiving tape 103 by being pressed against the print head 10.

The ribbon take-up roller 106 and the pressure joint roller 107 are driven in rotation by transmitting the drive force of the cartridge motor 23 (refer to FIG. 2 described above), which is, for example, a pulse motor disposed to the outside of the cartridge 100 to the ribbon take-up roller drive shaft 11 and the pressure joint roller drive shaft 12.

The cartridge 100 arranged as described above is detachably mounted in the cartridge holder portion 19 disposed to the main body 8 described above. At the time, as shown in FIG. 3, intruding portions 19a, 19b are formed to side surfaces of the cartridge holder portion 19 at two positions (in the example, two positions in a right to left direction of FIG. 3) in a direction in which the cartridge 100 is mounted and dismounted (in a direction vertical to a sheet surface in FIG. 3). With this arrangement, the mounting/dismounting property of the cartridge 100 to the cartridge holder portion 19 can be improved by permitting an operator to mount and dismount the cartridge 100 by inserting fingers into the intruding portion 19a, 19b while gripping the cartridge 100 with the fingers.

With the above arrangement, when the operator mounts the cartridge 100 in the cartridge holder portion 19 while gripping it, a roll holder (not shown) is shifted from a separating position to an abutting position, and the print-receiving tape 103 and the ink ribbon 105 are clamped between the print head 10 and a platen roller 108 as well as the cover tape 101 and the print-receiving tape 103 are clamped between the pressure joint roller 107 and a sub roller 109 (bonding device). When the ribbon take-up roller drive shaft 11 and the pressure joint roller drive shaft 12 are driven by the cartridge motor 23, the ribbon take-up roller 106 and the pressure joint roller 107 are driven in rotation in synchronism with each other in the directions shown by arrows B and C. At the time, since the pressure joint roller drive shaft 12, the sub roller 109, and the platen roller 108 are coupled with each other through a gear (not shown), when the pressure joint roller drive shaft 12 is driven, the pressure joint roller 107, the sub roller 109, and the platen roller 108 are rotated. With this operation, the cover tape 101 is fed out from the first roll 102 and supplied to the pressure joint roller 107.

In contrast, the print-receiving tape 103 is fed out from the second roll 104, and the ink ribbon 105, which is fed by the ribbon-supply-side roll 111 and ribbon take-up roller 106 disposed on the back side of the print-receiving tape 103 (that is, on the side where it is bonded to the cover tape 101) in the direction shown by an arrow D, is pressed against the print head 10 described above and abutted against the back surface of the print-receiving tape 103. At the time, a plurality of heating elements of the print head 10 are energized by the print drive circuit 25, thereby a letter R corresponding to the RFID circuit element To on the cover tape 101 to be bonded (refer to FIG. 8 to be described later) is printed on the back surface of the print-receiving tape 103. Then, the cover tape 101 and the print-receiving tape 103 having been subjected to the print are bonded to each other and integrated by the pressure joint roller 107 and the sub roller 109, formed as the printed tag label tape and transported to the outside of the cartridge 100. Note that the ink ribbon 105, through which the print-receiving tape 103 has been subjected to the print, is taken up by the ribbon take-up roller 10b by driving the ribbon take-up roller drive shaft 11.

FIG. 4 is a conceptual side sectional view taken along the section P-P' of FIG. 3 and shows an example of a detailed structure of the guide roller 112.

In FIG. 4, the guide roller 112 includes an approximately cylindrical hollow roller body 112A, a through hole 112B passing through the roller body 112A in an axial direction, and an irregular portion 112C formed on the radially outer peripheral side of the roller body 112A.

Approximately-round-bar-shaped upper and lower guide roller support portions 100Aa, 100Ab, which are disposed to the housing 100A of the cartridge 100, are inserted into the through hole 112B. Not shown bearings are interposed between the through hole 112B and the guide roller support portions 100Aa, 100Ab, thereby the guide roller 112 is rotatably supported by the housing 100A.

With the above structure, even if a position to which the cover tape 101 is fed out from the first roll 102 is changed as the cover tape 101 is exhausted (refer to a two-dot-and-dash line in FIG. 3), the guide roller 112 guides a path of the cover tape 101 fed out from the first roll 102 (as described above, from the guide roller 112 or the through hole 113A of the shield member 113 to the pressure joint roller drive shaft 12) so that the path is located near to the antenna 14 at all times (in other words, regulates the positional relation between the path of the cover tape 101 and the antenna 14 within a predetermined range).

Not that the irregular portion 112C is formed in, for example, a saw-teeth shape to reduce the area thereof in contact with the cover tape 101 as much as possible in the guide operation as described above to prevent the cover tape 101 from being bonded by the adhesive material of the adhesive layer 101a. Further, an appropriate material, which is unlike to cause bonding due to the adhesive material is employed as a material constituting the roller body 112A.

FIG. 5 is a function block diagram showing a detailed function of the radio frequency circuit 21. In FIG. 5, the radio frequency circuit 21 is composed of a transmission portion 32 for transmitting a signal to the RFID circuit element To through the antenna 14, a receiving portion 33 for inputting a wave received by the antenna 14 and reflected from the RFID circuit element To, and a transmit-receive splitter 34.

The transmission portion 32 includes a crystal oscillator 35 for generating a carrier wave for accessing the RFID tag communicating information of the IC circuit part 151 of the RFID circuit element To (for carrying out write or read); a PLL (Phase Locked Loop) 36; a VCO (Voltage Controlled Oscillator) 37; a transmission multiplying circuit 38 for subjecting the generated carrier wave to modulation based on a signal supplied from the signal processing circuit 22 (in this example, for subjecting it to amplitude modulation based on a "TX_ASK" signal supplied from the signal processing circuit 22; however, in the amplitude modulation, an amplification factor variable amplifier and the like may be used in the amplitude modulation); and a variable transmission amplifier 39 for amplifying a modulated wave modulated by the transmission multiplying circuit 38 by determining an amplification factor by a "TX_PWR" signal from the control circuit 30. The generated carrier wave employs a frequency of a preferable UHF band an output from the transmission amplifier 39 is transmitted to the antenna 14 through the transmit-receive splitter 34 and supplied to the IC circuit part 151 of the RFID circuit element To.

The receiving portion 33 includes a first reception multiplying circuit 40 for multiplying the wave received by the antenna 14 and reflected from the RFID circuit element To; a first band-pass filter 41 for fetching only a signal of a necessary band from an output of the first reception multiplying circuit 40; a first receiving amplifier 43 for multiplying an output of the first band-pass filter 41 and supplying it to a first limiter 42; a second reception multiplying circuit 44 for multiplying the wave received by the antenna 14 and reflected from RFID circuit element To by the carrier wave whose phase is delayed 90° after it is generated; a second band-pass filter 45 for fetching only a signal of a necessary band from an output of the second reception multiplying circuit 44; and a second receiving amplifier 47 input with an output of the second band-pass filter 45 as well as multiplying the output and supplying it to a second limiter 46. A signal "RXS-I" output from the first limiter 42 and a signal "RXS-Q" output from the second limiter 46 are input to the signal processing circuit 22 and processed thereby.

Further, outputs from the first receiving amplifier 43 and the second receiving amplifier 47 are input also to an RSSI (Received Signal Strength Indicator) circuit 48, and signals "RSSI" showing the intensities of the signals are input to the signal processing circuit 22. With the above operation, in the label producing apparatus 2 of the embodiment, the wave reflected from the RFID circuit element To is modulated by I-Q orthogonal modulation.

FIG. 6 is a function block diagram showing a functional arrangement of the RFID circuit element To. In FIG. 6, the RFID circuit element To includes the antenna 152 for transmitting and receiving a signal to and from the antenna 14 on the label producing apparatus 2 side using the radio frequency of the UHF band the like in a non-contact mode and the IC circuit part 151 connected to the antenna 152.

The IC circuit part 151 includes a rectification part 153 for rectifying the carrier wave received by the antenna 152; a power source part 154 for accumulating the energy of the carrier wave rectified by the rectification part 153 and using it as a drive power source; a clock extraction part 156 for extracting a clock signal from the carrier wave received by the antenna 152 and supplying it to a control unit 155; a memory part 157 capable of storing a predetermined information signal; a modem part 158 connected to the antenna 152; and the control unit 155 for controlling actuation of the RFID circuit element To through the rectification part 153, the clock extraction part 156, the modem part 158, and the like.

The modem part 158 demodulates a communication signal supplied from the antenna 14 of the label producing apparatus 2 and received by the antenna 152 as well as modulates and reflects the carrier wave received by the antenna 152 based on a response signal from the control unit 155.

The control unit 155 carries out a basic control such as interpretation of the received signal demodulated by the modem part 158, creation of a return signal based on the information signal stored in the memory part 157 and return of the return signal by the modem part 158, and the like.

FIG. 7A and FIG. 7B are views showing an example of an outside appearance of a RFID tag label T formed by finishing to write the information to the RFID circuit element To and to cut off the printed tag label tape 110 as described above, wherein the FIG. 7A is an upper surface view, and the FIG. 7B is a lower surface view. Further, FIG. 8 is a lateral sectional view taken long the line VIII-VIII' of FIG. 7A.

In the FIG. 7A, FIG. 7B, and FIG. 8, the RFID tag label T has a five-layer structure in which the print-receiving tape 103 is added to the four-layer structure shown in FIG. 3, and five layers are composed of the print-receiving tape 103, the adhesive layer 101a, the base film 101b, the adhesive layer 101c, and the separation sheet 101d from the print-receiving tape 103 side (upper side in FIG. 8) to the opposite side thereof (lower side in FIG. 8). As described above, the RFID circuit element To including the antenna 152 disposed to the back side of the base film 101b is provided in the adhesive layer 101c as well as letters R (in the example, letters "RF-ID" showing a type of the RFID tag label T) is printed on the back surface of the print-receiving tape 103.

FIG. 9 is a view showing an example of a screen displayed on the terminal 5 or the general purpose computer 6 when the RFID tag communicating information of the IC circuit part 151 of the RFID circuit element To is accessed by the label producing apparatus 2 as described above (when information is written to or read from the RFID circuit element To).

In the example, the print letters R printed in correspondence to the RFID circuit element To, an access (write or read) ID that is an ID unique to the RFID circuit element To, an address of commodity information stored in the information servers 7, and addresses of the information corresponding to them in the route server 4, and the like can be displayed on the terminal 5 or the general purpose computer 6 in FIG. 9. When the terminal 5 or the general purpose computer 6 is manipulated, the label producing apparatus 2 is operated and the letters R are printed to the print-receiving tape 103 as well as the information such as the write ID, the commodity information, and the like are written to the IC circuit part 151 (or the RFID tag communicating information such as the commodity information and the like previously stored in the IC circuit part 151 is read).

In the above write (or read) operation, a correspondence relation between the ID of the created RFID tag label T and the information read from the IC circuit part 151 of the RFID tag label T (or the information written to the IC circuit part 151) is stored in the route server 4 described above and can be referred to when necessary.

FIG. 10 is a flowchart showing a control procedure carried out by the control circuit 30 to produce the RFID tag label T described above. That is, in the flowchart, the cover tape 101 is transported and the RFID tag communicating information is written while the print-receiving tape 103 is transported and a predetermined letter is printed thereto by the print head 10, the printed tag label tape 110 is produced by bonding the print-receiving tape 103 to the cover tape 101, and then RFID tag labels T are produced by cutting the printed tag label tape 110 on a RFID circuit element To to RFID circuit element To basis.

In FIG. 10, first, at step S105, the flow is started by carrying out a write manipulation of the label producing apparatus 2. Then, the RFID tag communicating information, which is input through the terminal 5 or the general purpose computer 6 and to be written to the RFID circuit element To, and print information, which is to be printed to the RFID tag label T by the print head 10 in correspondence to the RFID tag communicating information, are read through the communication line 3 and the input/output interface 31.

Thereafter, at step S110, variables M and N for counting the number of times of retry carried out when communication failure is doubted and a flag F showing whether or not communication is succeeded are initialized.

At step S115, a control signal is output to the cartridge drive circuit 24, and the ribbon take-up roller 106 and the pressure joint roller 107 are driven in rotation by the drive force of the cartridge motor 23. With this operation, the cover tape 101 is fed out from the first roll 102 and supplied to the pressure joint roller 107, and the print-receiving tape 103 is fed out from the second roll 104. Further, a control signal is output to the feed roller motor 28 through the feed roller drive circuit 29, thereby the feed rollers 17 is driven in rotation. As a result, the cover tape 101 is bonded to the print-receiving tape 103 by the pressure joint roller 107 (and by the sub roller 109) and integrated with each other as described above and then transported to the outside of the cartridge 100.

Thereafter, the process goes to step S120 at which it is determined whether or not the cover tape 101 and the print-receiving tape 103 are transported a predetermined value L (for example, a transport distance in which the RFID tag communicating information has been written and printed to a preceding RFID circuit element To and the print region of the print-receiving tape 103 corresponding to it and a next RFID circuit element To has reached a position approximately confronting the antenna 14). It is sufficient to determine the transport distance at the time by detecting an appropriate identification mark formed to the cover tape 101 by a known tape sensor and the like provided separately. When the determination is Yes, the process goes to step S200.

At step S200, after tag information write processing is carried out and a memory to which tag information is written is initialized (delete processing), a transmission signal including the RFID tag communicating information is transmitted to the RFID circuit element To on the cover tape 101 and written thereto (as to the detail of the step, refer to FIG. 11 to be described later). When the processing at step S200 is finished, the process goes to next step S210.

At step 210, the print head 10 is energized by outputting a control signal to the print drive circuit 25, and the letters R such as characters, signs, bar codes, and the like read at previous step S105 are printed to a region corresponding to a RFID circuit element To to be processed in the print-receiving tape 103 (the region bonded to the back surface of the RFID circuit element To by the pressure joint roller 107). When the processing at step S210 is finished, the process goes to next step S125.

At step S125, whether or not flag F=0 is determined. When the write processing is normally finished, since F=0 is kept as it is (refer to step S385 of a flow of FIG. 11 to be described later), the determination is Yes, and the process goes to step S130.

At step S130, a combination of the information written to the RFID circuit element To at step S200 and the print information already printed by the print head 10 in correspondence to the above information is output through the terminal 5 or the general purpose computer 6 through the input/output interface 31 and the communication line 3 and stored to the information servers 7 and the route server 4. Note that the stored data is stored and kept to, for example, a database so that it can be referred to by the terminal 5 or the general purpose computer 6 when necessary.

Thereafter, at step S135, it is determined whether or not the print to the region corresponding to the RFID circuit element To to be processed in the print-receiving tape 103 is entirely finished, and then the process goes to step S140.

When the write processing is not normally finished due to any reason at step S125 described above, since F=1 (refer to step S385 of the flow of FIG. 11 to be described later), the determination at step 125 is No, and the process goes to step S137. At step S137, the print operation is stopped by deenergizing the print head 10 by outputting a control signal to print drive circuit 25. It can be clearly shown that the RFID circuit element To is a defective product by interrupting the print operation. Note that a special mode of letters may be printed as a warning or a reminder of the defective product in place of interrupting the print operation. When the processing at step S137 is finished, the process goes to step S140.

At step S140, it is determined whether or not the printed tag label tape 110 is further transported a predetermined amount (for example, a transport distance in which all of the RFID circuit element To to be processed and the print region of the print-receiving tape 103 corresponding to the RFID circuit element To move beyond the cutter 15 by a predetermined length (an amount of margin). It is sufficient to determine the transport distance at the time by, for example, detecting a marking by a tape sensor likewise step S120 described above. When the determination is Yes, the process goes to step S145.

At step S145, the drive of the cartridge motor 23 and the feed roller motor 28 is stopped by outputting a control signal to the cartridge drive circuit 24 and the feed roller drive circuit 29, thereby the rotation of the ribbon take-up roller 106, the pressure joint roller 107, and the feed rollers 17 is stopped. With this operation, the cover tape 101 being fed out from the first roll 102, the print-receiving tape 103 being fed out from the second roll 104, and the printed tag label tape 110 being transported by the feed rollers 17 are stopped.

Thereafter, at step S150, the solenoid 26 is driven by outputting a control signal to the solenoid drive circuit 27, and the printed tag label tape 110 is cut off by the cutter 15. As described above, at the time, since the entire printed tag label tape 110, to which, for example, the RFID circuit element To to be processed and the print region of the print-receiving tape 103 corresponding to it is bonded, is transported sufficiently beyond the cutter 15, when the printed tag label tape 110 is cut off by the cutter 15, label-shaped RFID tag labels T, in each of which the RFID tag communicating information is written to the RFID circuit element To as well as a predetermined print corresponding to it is made, are produced.

Thereafter, the process goes to step S155, at which the feed roller motor 28 is driven again by outputting a control signal to the feed roller drive circuit 29, thereby the feed rollers 17 are rotated. With this operation, the RFID tag labels T formed in the label shape at step S150 are transported again to the delivery port 16 by the feed rollers 17 and discharged to the outside of the label producing apparatus 2 from the delivery port 16.

FIG. 11 is a flowchart showing a detailed procedure at step S200 described above. In FIG. 11, first, at step S310, an identification number ID, which is to be allocated to the RFID circuit element To to which data is written, is set by an appropriate known method.

Thereafter, at step S320, an "Erase" command is output to the signal processing circuit 22 to initialize the information stored in the memory part 157 of the RFID circuit element To. An "Erase" signal as access information is created in the signal processing circuit 22 based on the "Erase" command and transmitted to the RFID circuit element To, to which information is written, through the radio frequency circuit 21, thereby the memory part 157 of the RFID circuit element To is initialized.

Next, at step S330, a "Verify" command is output to the signal processing circuit 22 to confirm the contents of the memory part 157. A "Verify" signal as access information is created in the signal processing circuit 22 based on the "Verify" command and transmitted to the RFID circuit element To, to which information is written, through the radio frequency circuit 21 so that a replay is prompted. Thereafter, at step S340, a reply signal transmitted from the RFID circuit element To, to which information is written, is received through the antenna 14 and fetched through the radio frequency circuit 21 and the signal processing circuit 22.

Next, at step S350, the information in the memory part 157 of the RFID circuit element To is confirmed based on the reply signal, and whether the memory part 157 is normally initialized or not is determined.

When the determination is No, the process goes to step S360 at which M is incremented by 1, and further whether M=1 or not is determined at step S370. When M≦4, since the determination is No, the process returns to step S320 at which the same procedures are repeated. When M=5, the process goes to step S380 at which an error display signal is output to the terminal 5 or the general purpose computer 6 through the input/output interface 31 and the communication line 3, and a corresponding write error display is carried out, thereby the flow is finished. Even if the initialization fails, it is retried up to five times. Note that, when the cover tape 101 wound round the first roll 102 is entirely exhausted, since the reply signal is not received at S340 because the RFID circuit element To does not exist, the determination at step S350 is No, and thus the above display is also carried out.

When the determination at step S350 is Yes, the process goes to step S290 at which a "Program" command is output to the signal processing circuit 22 to write desired data to the memory part 157. A "Program" signal as access information including ID information, which is desired to be written in the signal processing circuit 22, is creased based on the "Program" command and transmitted to the RFID circuit element To, to which information is to be written, through the radio frequency circuit 21, and the information is written to the memory part 157 of the RFID circuit element To.

Thereafter, at step S400, a "Verify" command is output to the signal processing circuit 22. A "Verify" signal as access information is created in the signal processing circuit 22 based on the "Verify" command and transmitted to the RFID circuit element To, to which information is to be written, through the radio frequency circuit 21 so that a replay is prompted. Thereafter, at step S410, a reply signal transmitted from the RFID circuit element To, to which information is to be written, is received through the antenna 14 and fetched through the radio frequency circuit 21 and the signal processing circuit 22.

Next, at step S420, the information stored in the memory part 157 of the RFID circuit element To is confirmed based on the reply signal, and it is determined whether or not the predetermined information transmitted as described above is normally stored to the memory part 157.

When the determination is No, the process goes to step S430 at which N is incremented by 1, and further whether N=5 or not is determined at step S440. When N≦4, since the determination is No, the process returns to step S390 at which the same procedures are repeated. When N=5, the process goes to step S380 described above and causes the terminal 5 or the general purpose computer 6 to carry out a corresponding display a write error and sets the flag described above to F=1 at step S385, thereby the flow is finished. Even if it is failed to write the information, it can be retried up to five times as described above.

When the determination at step S420 is Yes, the process goes to step S450 at which a "Lock" command is output to the signal processing circuit 22. A "Lock" signal is created in the signal processing circuit 22 based on the "Lock" command and transmitted to the RFID circuit element To, to which information is to be written through the radio frequency circuit 21, thereby it is prohibited to write new information to the RFID circuit element To. With this operation, the RFID tag communicating information has been written to the RFID circuit element To, to which information is to be written, and the RFID circuit element To is discharged as described above, thereby the flow is finished.

With the above routine, it is possible to write the corresponding RFID tag communicating information to the RFID circuit element To, to which information is to be written, on the cover tape 101.

In the above arrangement, the transmission portion 32 of the radio frequency circuit 21 and the signal processing circuit 22 constitute the a RFID tag communicating information creating device for creating the RFID tag communicating information to be written to the IC circuit part of the RFID circuit element disposed to the tag tape of the respective aspects of the present invention.

In the label producing apparatus 2 of the embodiment arranged as described above, when the cartridge 100 is mounted in the cartridge holder portion 19 and the ribbon take-up roller drive shaft 11 and the pressure joint roller drive shaft 12 are driven by the cartridge motor 23, the ribbon take-up roller 106 and the pressure joint roller 107 are driven in rotation. With this operation, the cover tape 101 is fed out from the first roll 102, the RFID tag communicating information, which is created by the signal processing circuit 22 and the radio frequency circuit transmission portion 32, is transmitted, by wireless communication, to the antennas 152 of the RFID circuit elements To on the cover tape 101 just before it reaches the pressure joint roller 107 after it is fed out from the first roll 102, through the antenna 14 and written to the IC circuit parts 151. Then, the print-receiving tape 103, which is fed out from the second roll 104, and the cover tape 101, which is fed out from the first roll 102 and to which the RFID tag communicating information is written as described above, are bonded to each other by the pressure joint roller 107 and made to the printed tag label tape 110, thereby the RFID tag labels T are created.

When the first roll 102 (tag tape roll) is arranged as the cartridge as in the embodiment, the antenna 14 must be disposed at a position relatively near to the cartridge 100 to write information to the RFID circuit element To of the cover tape 101 in the cartridge 100. In the embodiment, since the antenna 14 is disposed in the vicinity of the path in the surface intersecting the tape surface (in the example, the surface orthogonal to the tape surface) in the path of the cover tape 101 (from the guide roller 112 or the passing-through hole 113A of the shield member 113 to the pressure joint roller drive shaft 12) fed out from the first roll 102 on the distal side in the direction in which the cartridge 100 is mounted, the cartridge 100 can be mounted in and dismounted from the cartridge holder portion 19 without disturbing the mounting/dismounting property thereof at all. Further, since the position at which the antenna 14 is disposed does not interfere with the intruding portions 19a, 19b of the cartridge holder portion 19 described above, when the cartridge 100 is mounted and dismounted, the operator is not disturbed to grip the sides of the cartridge 100 with fingers. Further, since the antenna 14 is disposed by positively making use of the surface intersecting the surface of the cover tape 101 with respect to the path of thereof, that is, the position in the vicinity of the surface intersecting the surface of the cover tape 101, other members can be disposed to a remaining portion, thereby a degree of freedom of layout of the cartridge holder portion 19 can be increased.

As described above, according to the label producing apparatus 2 of the embodiment, the first roll 102 (tag tape roll) can be arranged as the cartridge without restricting the mounting/dismounting property of the cartridge 100 and the layout of the cartridge holder portion 19.

Further, since the mounting/dismounting property of the cartridge 100 and the layout of the cartridge holder portion 19 are not restricted as described above, a cartridge, which creates an ordinary label without creating the RFID tag label T, can be also detachably mounted in the cartridge holder portion 19, from which an advantage can be obtained in that the label producing apparatus can be made more user-friendly.

Further, even if a position to which the cover tape 101 is fed out from the first roll 102 changes, since the positional relation between the path of the cover tape 101 and the antenna 14 is kept unchanged at all times by the provision of the guide roller 112, a stable and reliable RFID tag communicating information write performance can be secured.

Further, since the patch antenna having the directional property is used as the antenna 14, a radio wave can be prevented from being wastefully transmitted in a direction in which it is not necessary to transmit the radio wave. Further, since the antenna 14 is formed in a flat shape, the label producing apparatus 2 can be arranged compact.

It should be noted that the present invention is by no means limited to the above embodiment and can be variously modified within a range that does not depart from the gist and the technical idea of the embodiment. These modifications will be sequentially described below.

(1) Variation of Position at which the Antenna is Disposed:

FIG. 12 is a sectional view simply showing a structure in the cartridge holder portion 19 of a modification in which the antenna is disposed to a position different from the embodiment and corresponds to a section taken along the line XII-XII' of FIG. 3. In FIG. 12, portions similar to those in FIG. 3 are denoted by the same reference numerals and the description thereof is appropriately omitted.

In FIG. 12, the modification is arranged such that an antenna 14' is composed of a directional antenna (patch antenna) having a directional property on one side (in the example, the direction of an arrow E in FIG. 12) as well as disposed in the vicinity of a path in a surface intersecting the tape surface in the path of the cover tape 101 at an appropriate intersecting angle in place of an orthogonal angle as in the above embodiment (that is, as shown in FIG. 12, the antenna 14' is disposed obliquely to the bottom of the cartridge holder portion 19 in a lengthwise direction of the cartridge 100', that is, in a horizontal direction in FIG. 12) At the time, the antenna 14' is disposed to secure spaces into which fingers of the operator can be inserted into the intruding portions 19a, 19b of the cartridge holder portion 19 described above, thereby the mounting/dismounting property of the cartridge 100' can be excellently maintained by the operator.

Further, FIG. 13 is a sectional view simply showing a structure in the cartridge holder portion 19 of a modification in which the antenna is disposed to a further different position and corresponds to a section taken along the line XIII-XIII' of FIG. 3. In FIG. 13, portions similar to those in FIG. 3 are denoted by the same reference numerals and the description thereof is appropriately omitted.

In FIG. 13, an antenna 14" of the modification is composed of a directional antenna (patch antenna) having a directional property on one side (in the example, the direction of an arrow F in FIG. 13) as well as disposed obliquely to the bottom of the cartridge holder portion 19 in a direction in which the cover tape 101 is transported (a horizontal direction in FIG. 13). Note that, to prevent the position at which the antenna 14" is disposed in the modification from interfering with the intruding portions 19a, 19b of the cartridge holder portion 19, it is needless to say that the antenna 14" does not disturb the operator to grip sides of the cartridge 100 when it is mounted and dismounted.

In the two modifications, it is also possible to dispose the antenna 14', 14" such that they do not disturb the mounting/dismounting property of the cartridge 100 to the cartridge holder portion 19 at all. Further, since a degree of freedom of layout of the cartridge holder portion 19 can be increased, there can be obtained the same advantage as the above embodiment in that the first roll (tag tape roll) 102 can be arranged as the cartridge without restricting the mounting/dismounting property of the cartridge 100 and the layout of the cartridge holder portion 19.

(2) When Bonding is not Carried Out:

In the modification, the present invention is applied to a cartridge for a label producing apparatus that carries out a print to a cover film disposed to a tag tape in place of that a print is carried out to the cover film 103 other than the cover tape 101 provided with the RFID circuit elements To as in the above embodiment.

FIG. 14 is an explanatory view explaining a detailed structure of a cartridge 100' of the modification and corresponding to FIG. 3 described above of the above embodiment. In FIG. 14, portions similar to those in FIG. 3 described above are denoted by the same reference numerals and the description thereof is appropriately omitted.

In FIG. 14, the cartridge 100' includes a first roll (tag tape roll) 102' around which a heat sensitive tape (tag tape, tag medium) 101' is wound and a tape feed roller 107' for feeding the heat sensitive tape 101' to the outside of the cartridge 100'.

The first roll 102' winds the strip-shaped transparent heat sensitive tape 101', on which a plurality of the RFID circuit elements To are sequentially formed in a lengthwise direction, around a reel member 102'a. The heat sensitive tape 101' wound around the first roll 102' has a three-layer structure in the example (refer to a partly enlarged view in FIG. 14) and is composed of a cover film 101'a composed of PET (polyethylene terephthalate) and the like, an adhesive layer 101'b composed of an appropriate adhesive material, and a separation sheet 101'c laminated in this order from a side wound outside (on the right side in FIG. 14) to an opposite side (on the left side in FIG. 14).

The IC circuit parts 151 for storing information is formed on the back side of the cover film 101'a integrally therewith, and antennas 152 are formed on the front surface of the back side of the cover film 101'a. The separation sheet 101'c is bonded to the back side of the cover film 101'a by the adhesive layer 101'b.

Further, the cartridge 100' includes a guide roller (guide device) 112', a shield member 113' for causing the cover tape 101' to pass through a through hole 113'A thereof to reduce leakage of a radio wave signal from an antenna 14-1 to the first roll 102', and a transport conversion roll 120 for transporting the heat sensitive tape 101' while greatly converting the transport direction thereof in a housing 100'A. The antenna 14-1 composed of a directional antenna (in the example, a so-called a patch antenna) having a directivity on one side (on the proximal side to a sheet surface in FIG. 14) of the cartridge 100' is disposed on a distal side in a direction in which the cartridge 100' is mounted (on the distal side to the sheet surface in FIG. 14). The antenna 14-1 is disposed in the vicinity of a path in a surface intersecting a tape surface (in the example, a surface orthogonal to the tape surface; however, the surface is not limited to it and may intersect the tape surface at an angle of 45°, 60°, or the like) in a path of the cover tape 101' (from a guide roller 112' to the transport conversion roll 120) fed out from the first roll 102'.

In the above arrangement, when the cartridge 100' is mounted in the cartridge holder portion 19 of the label producing apparatus 2 and a roller holder (not shown) is moved from a separating position to an abutting position, the heat sensitive tape 101' is clamped between the print head 10 and the platen roller 108 as well as clamped between the tape feed roller 107' and the sub roller 109. When the pressure joint roller drive shaft 12 is driven by the drive force of the cartridge motor 23 (for example, refer to FIG. 2 and the like), the tape feed roller 107', the sub roller 109, and the platen roller 108 are rotated in synchronism with each other and the heat sensitive tape 101' is fed out from the first roll 102'.

After the RFID tag communicating information is accessed (information is written/read) to the heat sensitive tape 101' fed out from the first roll 102' as described above in a path from the guide roller 112' to the transport conversion roll 120 through the antenna 14-1, the heat sensitive tape 101' is supplied to the print head 10. A plurality of heating elements of the print head 10 are energized by the print drive circuit 25 (refer to FIG. 2 and the like). As a result, a print is carried out on the front surface of the cover film 101'*a* of the heat sensitive tape 101', and the heat sensitive tape 101' is arranged as a printed tag label tape 110'. Thereafter, the printed tag label tape 110' is transported to the outside of the cartridge 100'. It is needless to say the print may be carried out using an ink ribbon as in the above embodiment.

After the heat sensitive tape 101' is transported to the outside of the cartridge 100', although it is transported by the feed rollers 17 and cut off by the cutter 15 in the same manner as the above embodiment, the description of it is omitted.

It should be noted that although the print is carried out to the cover film 101'*a* by abutting the print head 10 thereagainst from the outside of the cartridge, the modification is not limited thereto, and the print may be carried out from the inside of the cartridge likewise the above embodiment (however, in this case, a mirror letter is not used). FIG. 15 is an explanatory view corresponding to FIG. 14 to explain a detailed structure of a cartridge 100'' in the modification. In FIG. 15, portions similar to those in FIG. 14 are denoted by the same reference numerals and the description thereof is appropriately omitted.

In FIG. 15, the cartridge 100'' includes a first roll (tag tape roll) 102'' around which a heat sensitive tape 101'' (tag tape, tag medium) is wound, and the tape feed roller 107' for feeding the heat sensitive tape 101'' to the outside of the cartridge 100''.

The first roll 102'' winds the strip-shaped transparent heat sensitive tape 101'', on which a plurality of the RFID circuit elements To are sequentially formed in a lengthwise direction, around a reel member 102''*a*.

The heat sensitive tape 101'' wound around the first roll 102'' has a three-layer structure in the example (refer to a partly enlarged view in FIG. 15) and is composed of a separation sheet 101''*a*, an adhesive layer 101''*b* composed of an appropriate adhesive layer, and a cover film 101''*c* composed of PET (polyethylene terephthalate) and the like laminated in this order from a side wound outside (on the right side in FIG. 15) to an opposite side (on the left side in FIG. 15).

The IC circuit parts 151 are formed on the back side of the cover film 101''*c* (on the right side in FIG. 15) integrally therewith, and the antennas 152 for transmitting and receiving information are formed so as to connect to the IC circuit parts 151, and the RFID circuit elements To are composed of them.

The separation sheet 10''*a* is bonded to the back side (the right side of FIG. 15) of the cover film 101''*c* by the adhesive layer 101''*b* disposed to include the RFID circuit elements To. Note that, when a RFID tag label T finally finished in a label shape is bonded to a predetermined commodity and the like, it can be bonded thereto through the adhesive layer 101*c* exposed by separating the separation sheet 101''*a*.

Further, likewise FIG. 14, the cartridge 100'' includes the guide roller (guide device) 112', the shield member 113' for causing the cover tape 101'' to pass through the through hole 113' thereof to reduce leakage of a radio wave signal from the antenna 14-1 to the first roll 102'', and the transport conversion roll 120 for transporting the heat sensitive tape 101'' while greatly converting the transport direction thereof in a housing 100''A. Further, the antenna 14-1, which is composed of a directional antenna (in the example, a so-called a patch antenna) having a directivity on one side (on the proximal side to a sheet surface in FIG. 15) of the cartridge 100'', is disposed on a distal side in a direction in which the cartridge 100'' is mounted (on the distal side to the sheet surface in FIG. 15).

The antenna 14-1 is disposed in the vicinity of a path in a surface intersecting a tape surface (in the example, a surface orthogonal to the tape surface; however, the surface is not limited to it and may intersect the tape surface at an angle of 45°, 60°, or the like) in a path of the cover tape 101'' (from the guide roller 112' to the transport conversion roll 120) fed out from the first roll 102''.

In the above arrangement, when the cartridge 100'' is mounted in the cartridge holder portion 19 of the label producing apparatus 2 and the roller holder (not shown) is moved from a separating position to an abutting position, the heat sensitive tape 101'' is clamped between the print head 10 and the platen roller 108 as well as clamped between the tape feed roller 107' and the sub roller 109. When the pressure joint roller drive shaft 12 is driven by the drive force of the cartridge motor 23 (for example, refer to FIG. 2 and the like), tape feed roller 107', the sub roller 109, and the platen roller 108 are rotated in synchronism with each other and the heat sensitive tape 101'' is fed out from the first roll 102'' and supplied to the print head 10 side after its direction is greatly converted by the transport conversion roll 120. As described above, after the RFID tag communicating information is accessed (information is written/read) to the heat sensitive tape 101'' fed out from the first roll 102'' in a path from the guide roller 112' to the transport conversion roll 120 through the antenna 14-1 described above, the heat sensitive tape 101'' is supplied to the print head 10.

A plurality of heating elements of the print head 10 are energized by the print drive circuit 25 (refer to FIG. 2 and the like). As a result, a print is carried out on the front surface of the cover film 101''*c* of the heat sensitive tape 101'', and the heat sensitive tape 101'' is arranged as a printed tag label tape 110''. Thereafter, printed tag label tape 110'' is transported to the outside of the cartridge 100''. It is needless to say that the print may be carried out using an ink ribbon as in the above embodiment.

After the heat sensitive tape 101'' is transported to the outside of the cartridge 100'', although it is transported by the feed rollers 17 and cut off by the cutter 15 in the same manner as the above embodiment, the description of it is omitted.

In the two modifications, it is also possible to dispose the antenna 14'-1'' such that it does not disturb the mounting/dismounting property of the cartridges 100', 100'' to the cartridge holder portion 19 at all. Further, since a degree of freedom of layout of the cartridge holder portion 19 can be increased, there can be obtained the same advantage as that of the above embodiment in that the first rolls (tag tape rolls) 102', 102'' can be arranged as the cartridges without restricting the mounting/dismounting property of the cartridge 100', 100'' and the layout of the cartridge holder portion 19.

(3) When RFID Tag Communicating Information is Read:

Although the above description is made as to a case in which the RFID tag communicating information is read from and write to the IC circuit part of the RFID circuit element To as an example, the present invention is not limited thereto. That is, there is a case in which a label is created while reading RFID tag communicating information from a read only RFID circuit element in which predetermined RFID tag communicating information (tag identification information and the like) is previously stored and maintained in an unrewritable fashion and carrying out a print corresponding to the information, and the present invention can be also applied to the case.

In this case, only print information is read at step S105 in FIG. 10, and RFID tag communication information read processing is carried out at step S210 (as to the detail of the case, refer to FIG. 16 to be described later). Thereafter, at step S130, a combination of the print information and the read RFID tag communicating information is stored.

FIG. 16 is a flowchart showing a detailed procedure of the RFID tag read processing.

In FIG. 16, when a RFID circuit element To, from which information is to be read, is transported to the vicinity of the antenna 14, at step S501, a "Scroll All ID" command is output to the signal processing circuit 22 to read the information stored in the RFID circuit element To. A "Scroll All ID" signal as the RFID tag communicating information is created in the signal processing circuit 22 based on the "Scroll All ID" command and transmitted to the RFID circuit element To, from which information is to be read, through the radio frequency circuit 21 so that a reply is prompted.

Next, at step S502, a reply signal (the RFID tag communicating information including tag ID information and the like) transmitted from the RFID circuit element To, from which information is to be read, in correspondence to the "Scroll All ID" signal is received through the antenna 14 and fetched through the radio frequency circuit 21 and the signal processing circuit 22.

Next, at step S503, it is determined whether or not the reply signal received at step S502 has an error by a known detection symbol (CRC symbol; Cyclic Redundancy Check, and the like).

When the determination is No, the process goes to step S504 at which N is incremented by 1, and further whether N=5 or not is determined at step S505. When N≦4, since the determination is No, the process returns to step S501 at which the same procedures are repeated. When N=5, the process goes to step S506 at which an error display signal is output to the terminal 5 or the general purpose computer 6 through the input/output interface 31 and the communication line 3 and a corresponding read error display is carried out, and then the flag is set to F=1, thereby the routine is finished. Even if it is failed to read the information, it can be retried up to five times as described above so that reliability for read can be sufficiently secured.

When the determination at step S503 is Yes, the RFID tag communicating information has been read from the RFID circuit element To, from which information is to be read, thereby the routine is finished.

With the above routine, the RFID tag communicating information (tag identification information and the like) of the IC circuit part of the RFID circuit element To, from which information is to be read, can be accessed and read. The same advantage as the above embodiment can be also obtained by the modification.

Further, an example, in which the RFID tag communicating information is read from and written to the cover tape 101 (or the heat sensitive tapes 101', 101") which is moving in the cartridge 100 and the like, is shown in the above description. However, the present invention is not limited thereto and the print may be carried out and the information may be read and written by stopping the cover tape 101 and the like at a predetermined position (further, when the information is read and written, the cover tape 101 and the like are held by a predetermined transportation guide).

Further, although the above description is made as to an example in which the roll 102, 102', or 102" is composed of the base tape 101 or the heat sensitive tape 101', 101" as the tag tape wound around the reel member 102, 102' or 102", and the tape 101, 101', or 101" is fed out from the roll 102, 102', or 102" disposed in the cartridge 100, 100', or 100", the present invention is not limited thereto. For example, long flat-sheet-shaped or strip-shaped tapes or sheets, on each of which at least one RFID circuit element To is disposed (including tapes or sheets formed by rolling out a tape wound around a roll and then cut to an appropriate length), may be stacked and arranged as a cartridge, and tag labels may be formed by mounting the cartridge in the cartridge holder portion on the label producing apparatus 2 side, transporting the tapes or the sheets, and carrying out a print on them and writing information thereto. In this case, it is sufficient to dispose the antenna on the device side so that it is disposed in the vicinity of a transport path of the tapes or the sheets in a surface orthogonal to the surface of the tapes.

Further, the cartridge system may not be employed, and a structure for directly mounting the first roll 102 and the like on the housing 100A omitting the cartridge may be employed. Also in this case, the antenna 14 is disposed in the vicinity of a path in a surface (in the embodiment, an orthogonal surface) intersecting a tape surface in a path of the cover tape 101 fed out from the first roll 102' on a distal side in a direction in which the first roll 102' is mounted on the housing 100'A. As a result, since the first roll 102' can be mounted on and dismounted from a predetermined mounting/dismounting portion of the housing 100'A without disturbing the mounting/dismounting property thereof at all, the same advantage as the above embodiment can be obtained.

Further, it is assumed that the "Erase" signal, the "Verify" signal, the "Program" signal, and the like used above is complied with a specification developed by EPC global. EPC global is a nonprofit corporation established by International EAN Association as an international distribution code organization and Uniformed Code Council (UCC) as a US distribution code organization in cooperation with each other. Note that a signal complied with other standard may be used as long as it achieves a similar function.

Although not exemplified in detail, the present invention may be embodied by being modified within a range that does not depart from the gist thereof.

What is claimed is:
1. A label producing apparatus comprising:
an RFID tag communicating information creating device configured to create RFID tag communicating information for carrying out communication with an IC circuit part of an RFID circuit element having said IC circuit part for storing information and a tag antenna connected to said IC circuit part to transmit and receive information;
a cartridge holder portion configured to detachably mount a cartridge having a tag medium on which said RFID circuit element is disposed, thereon;
a feeding device configured to feed said tag medium of said cartridge along a predetermined transport path; and
a device antenna configured to transmit said RFID tag communicating information created by said RFID tag communicating information creating device to said tag antenna by wireless communication and carry out communication with said IC circuit part, disposed in the vicinity of said transport path,
wherein said device antenna includes an antenna surface disposed in a surface intersecting a tag medium plane defined by a surface direction of said tag medium in said transport path,
wherein said cartridge having a tag tape roll around which a tag tape as said tag medium is wound is detachably mounted in said cartridge holder portion, and said device antenna is disposed in the vicinity of a tag tape path in a surface intersecting a tag tape plane defined by a surface of the tag tape in said tag tape path fed out from said tag tape roll, wherein said surface, in which said antenna surface is disposed, is approximately orthogonal to the surface of the tape in said tag tape path, and wherein said device antenna is a patch antenna having a directivity on one side thereof.

2. The label producing apparatus according to claim 1, wherein:

said device antenna is disposed on a rear side of said cartridge holder portion along a direction in which said cartridge is mounted.

3. The label producing apparatus according to claim 1, wherein:

said cartridge holder portion includes recessed portions on the sides in a direction in which said cartridge is detachably mounted so that an operator detachably mounts said cartridge by gripping it with fingers.

4. The label producing apparatus according to claim 1, wherein:

said cartridge has a guide device configured to regulate the positional relation of said tape path of said tag tape with said device antenna within a predetermined range, disposed in a path of said tag tape fed out from said tag tape roll.

5. The label producing apparatus according to claim 1, further comprising:

a printing device configured to carry out a desired print job to a print-receiving tape fed out from a print-receiving tape roll arranged by winding said print-receiving tape; and a bonding device configured to bond said print-receiving tape subjected to the print job by said printing device to said tag tape.

* * * * *